Feb. 12, 1952     O. E. BATORI     2,585,618
NAVIGATIONAL COMPUTER OF THE SLIDE RULE TYPE
Filed Oct. 25, 1951

INVENTOR.
OSCAR E. BATORI
BY
James K. Franklin
ATTORNEYS.

Patented Feb. 12, 1952

2,585,618

UNITED STATES PATENT OFFICE 2,585,618

NAVIGATIONAL COMPUTER OF THE SLIDE RULE TYPE

Oscar E. Batori, New York, N. Y.

Application October 25, 1951, Serial No. 253,081
In Great Britain October 30, 1950

20 Claims. (Cl. 235—84)

This invention relates to navigational computers of the slide rule type.

Through this invention a new navigational computer has been created which simplifies and expedites the solution of navigational problems and the computations involved, improves the accuracy of navigation by determining correct speed with allowance for the temperature or density, compressibility and compressibility heating of air, and this without loss in the general use of the computer for numerical computations. By its simplicity, ease of operation and accuracy, the computer of the present invention contributes greatly to the performance and safety of pilot and aircraft.

One important object of the invention is to simplify the basic computations in navigation involving speed, distance and time.

Another important object of the invention is to determine correct air speed with allowance for air compressibility, an important factor particularly with modern high speed aircraft. Conventional general purpose computers neglect air compressibility and hence are in error up to 56 miles and more at high speed, consequently giving use to inaccuracy in computing such significant factors as time of flight and arrival, fuel required, ground speed, ground position, and the like.

Another object of the invention is to provide for new mechanical solutions for the ever present wind problems without requiring the practise of trigonometry in the air, the latter being difficult if not impossible for the pilot to carry out in the restricted area of the cockpit and with only one hand free for such operations.

Another object of the present invention is to provide a computer of simple structure which is inexpensive to produce.

Prior computers of the slide rule type, to perform a simple computation such as multiplication or division, use two coacting scales. One is the base scale on the base member, generally fixed in position, the other the slide scale, on the slide member, relatively movable with respect to the base scale. These two scales are used for the three arguments of a computation. In case of multiplication these arguments are the multiplicand, multiplier and result. In case of division they are the dividend, divisor and quotient. Accordingly one scale has to be used for the two arguments and the other for the third. Consequently certain rules have to be known and followed in the procedure. The scale on which each of the arguments must be set must first be determined, and the scale on which the result is to be read must be known. For users without mathematical background the procedure is complicated and difficult. Furthermore in the case of circular slide rules the results are given around a circular scale at varying locations, inconvenient for reading, necessitating turning the computer around in order to read the result. This invention utilizes three scales, one for each argument, thus avoiding any difficulty or misunderstanding as to which is to be used for a given argument. Furthermore it has a result indicator which is fixed in position. This result indicator gives all results at a permanent location, with the numbers in upright position in all cases, thus minimizing the need to turn the computer around for reading in many computations.

In air navigation the most frequent computations are for speed, distance and time. Prior navigational computers apply two scales for these three arguments. One scale, marked "Miles" is used for speed and also for distance. The other scale, marked "Minutes," is for the time element. To perform a computation with these three arguments and the two scales, one must first learn how to use the miles scale for the speed and the distance too, which is difficult for a beginner or for the user without mathematical background. In addition, when circular computers are involved all three arguments extend around the circular scale. First the eye must find the number involved and then make the reading inconveniently or else the computers must be turned for a better reading. This invention uses three separate scales, each on a different member, one scale being for distance, marked "Miles," one for the time element, marked "Minutes," and a third one for "Speed" and appropriately marked. There is nothing to learn; all the user has to do is simply to set the arguments on their respective designated scales. The speed is indicated in fixed result indicator window with the numbers in upright position for convenience in reading.

In speed, distance and time computations, to obtain speed in terms of distance per minute, the distance in miles must be divided by the time in minutes. To obtain speed in miles per hour, as is generally required, the speed per minute has to be multiplied by the constant factor of 60, since there are 60 minutes in one hour. The multiplication by 60 is done inherently in the computer of this invention by angularly translating the speed scale by logarithmic distance of 60 with respect to the minutes scale, thus greatly facilitating use of the computer.

Air speed is an important factor in air navigation and is measured generally by air speed indicators or meters. Air speed indicators are pressure measuring instruments and their reading will depend on the density of the air. The denser the air, the greater the pressure and the higher the reading. Therefore the air speed indicator can only be made to give the correct speed at one air density. An average density of air at sea level is chosen, the actual pressure being 1013.2 millibars or 29.92 inches of mercury and the temperature being arbitrarily chosen as 15 degrees centigrade or 59 degrees Fahrenheit. As the aircraft climbs, the air becomes less dense. Therefore the pressure built up by the forward speed of the aircraft is less and the air speed indicator consequently reads low. The density of the air can be recorded by the altimeter, provided that it has first been set to the standard pressure of 1013.2 millibars or 29.92 inches. The reading it gives with this setting is called "pressure altitude," and this reading can be used to correct the air speed indicator for air density. Air density is also affected by temperature and therefore allowance has to be made for temperature as well as for the pressure altitude.

At high speeds another factor becomes important. This is "compressibility," which results from the fact that at high speeds the air at the pitot head cannot move out of the way of the aircraft fast enough and therefore the pressure builds up more than it should. This tends to make the air speed indicator read high. Also, at the thermometer bulb the compressibility effect heats up the air and hence the thermometer reads higher than the actual air temperature.

To find true air speed corrections must therefore be made: (a) for density, measured by pressure altitude and temperature; (b) compressibility and (c) compressibility heating. Prior computers of the conventional type correct air speed for density only, neglecting compressibility altogether, and consequently are in error in determining speed. The computer of this invention, on the other hand, corrects air speed not only for density, but for the two other factors as well. These latter corrections are made by new scales, created in connection with and used first in this invention. The scales are: The pressure altitude and temperature scales which correct for density and compressibility, and a separate scale which corrects for compressibility heating. These scales cooperate with one another and with the time and distance scales so as to facilitate use of the computer for all computations, simple and complex.

Special navigational computers exist which correct air speed for compressibility and compressibility heating by using special scales instead of the standard logarithmic scales for distance and time. These computers, however, are of a limited use only and cannot be used for other computations as well, thus necessitating an additional computer for regular time, speed and distance computations.

For economical engine performance, the flier may wish to know the density of the air which is being fed into his engine. This can be expressed as a height, after allowing for the actual air temperature, and is then known as density altitude. The computer of this invention facilitates the determination of density altitude.

The flier must not only be able readily to compute speed, time and distance problems with a high degree of accuracy, but must also be able to allow for the effect of wind if his navigation is to be accurate. The reverse face of the computer of the present invention, which, like the face just described, comprises two fixed members and one relatively movable member, one of the fixed members having a window through which a portion of the scale on the movable member is visible, permits the solution of wind problems in slide rule fashion. It thus departs radially from conventional computers which, because they require the pilot to solve the wind problem graphically, present obvious disadvantageous features.

One further improvement of the invention relates to a new mechanical arrangement to obtain perfect concentricity of the coacting disks and the scales thereon, indispensable if correct computational results are to be attained. This is achieved by making the disks relatively adjustable with respect to their centers. Another new mechanical feature of the invention relates to the use of spring arms acting against the rotating parts and causing a slight drag in their movement, thus securing them against accidental shifts.

To the accomplishment of the above, and to such other objects as may hereinafter be revealed, the present invention relates to a computer construction and to the choice, design and arrangement of scales thereon, as defined in the appended claims and as described in this specification, taken together with the accompanying drawings, in which:

Figure 1:
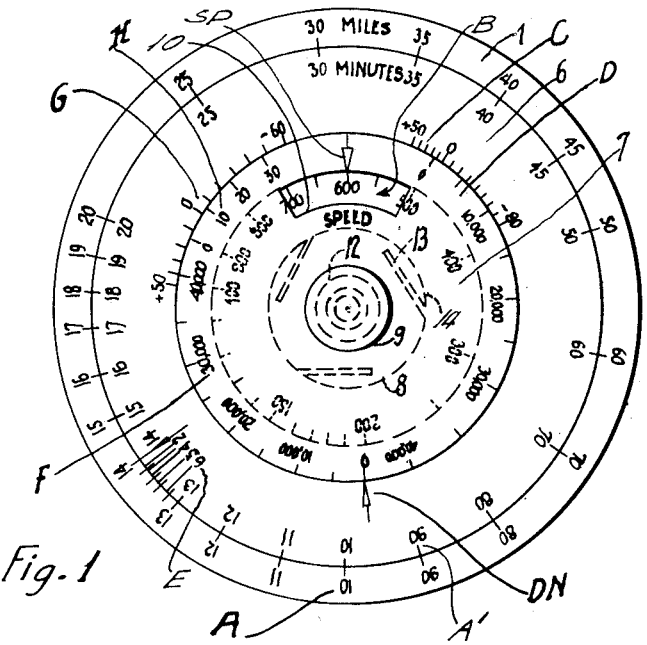
Fig. 1 is a plan view of the front or speed-time-distance face of the computer.
Figure 2:
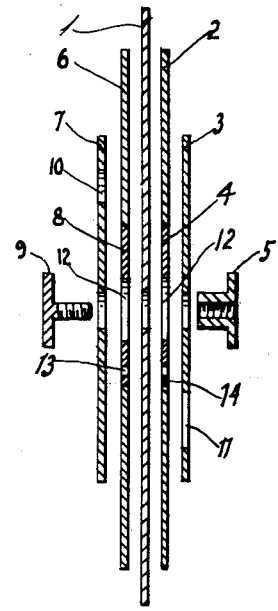
Fig. 2 is a cross-sectional view through the computer and showing the parts separated.

Referring to the drawings, the computer includes a fixed base member 1 of largest diameter having logarithmic scales A and K on opposite faces. Immediately on the front of the fixed member 1 is a ring member 6 of smaller outer diameter than member 1 and having an inner diameter of a size to accommodate an inner disk member 8. Ring member 6 has inner and outer scales B and A' only on the front face thereof, while disk member 8 is not provided with any scales and acts as a spacer and as a bearing for the rotation of ring member 6.

Outer disk member 7, hereinafter sometimes referred to as the result indicator member, is fixedly secured to base member 1 on top of movable ring member 6. Disk member 7 is of smaller diameter than ring member 6 but of larger diameter than disk member 8. In disk member 7 there is provided a window 10 to expose to view a part of inner scale B inscribed on ring member 6 and it is also provided with logarithmic scales D, F and H near its outer perimeter.

On the other side of central fixed member 1 is ring member 2, the construction and mounting of which is similar to ring member 6, said ring member 2 being provided with outer scale J and inner composite scale M, N, O. Disk member 4 is located inside ring member 2 and is of similar construction to disk member 8, thereby acting as a spacer and as a bearing for the rotation of disk member 2. An outer disk or result indicator member 3 of construction and mounting similar to disk member 7 is also provided. Result indicator member 3 has a window 11 which exposes to view parts of the inner composite scale M, N, O of ring member 2.

The members so far described are held in cooperative relationship by screw 9 and nut 5 upon which they are mounted concentrically. The inside diameter of disk members 4 and 8 is slightly larger than the outside diameter of nut 5 received therethrough, as can be observed at 12, so that it is possible to concentrically adjust the disk members 4 and 8 and therewith the ring members 2 and 6 before tightening the nut 5 and the screw 9 to fix the members 1, 3 and 7 together. Accordingly, there is a certain amount of adjustment possible between the various disks in order to correct for defects in their concentricity.

A certain amount of frictional drag between the bearing surfaces of ring members 6 and 2 and their cooperating disk members 8 and 4 may be provided by means of chordal slots 13 cut in the periphery of disk members 8 and 4 thereby to provide spring arms 14 exerting radial spring pressure against the inner surfaces of ring members 2 and 6. This feature largely eliminates play between the cooperating bearing surfaces, unavoidable in mass production, and will also serve to retain movable disk members 6 and 2 in their set positions against accidental displacement.

The front faces of members 1 and 6 are provided with scales A and A' respectively, each consisting of identical standard logarithmic scales of one logarithmic unit wherein log 10 is equal to 360 degrees of rotation. These scales are graduated from 10 to 100. The scale A on base member 1 is marked in miles, representing distance, and the cooperating identical scale A' near the periphery of ring member 6 is marked in minutes for the time of flight. The indicia of these scales are actually the logarithmic values of the respective numbers, but for simplicity they will be referred to hereinafter as the actual numbers or corresponding values, as is usual with slide rules.

On the front face of ring member 6 there is also an inner scale B which represents speed values, here shown calibrated in units of miles per hour. This scale B is inverted with respect to scale A and represents speed values from 100 to 1000 M. P. H. It is concealed from view by disk member 7 except where it is exposed through window 10. Furthermore, it is angularly shifted relatively to scale A by the logarithmic value of 60. Scale B cooperates with the arrow marked SP on member 7, located at the center of the window 10.

For the sake of simplicity the scales are generally shown in the drawing with only their main indicia but without subdivisions.

When using the computer so far described, a given speed may be set on scale B opposite the pointer SP and the distance which may be flown in a given time will be readily available on the miles scale A opposite to the time on the minutes scale A. Normally such a computation implies a multiplication by 60 which is eliminated by angularly disposing the scale B by log 60, as mentioned above.

Scale C on disk member 6 cooperates with scale D on the result indicator member 7 and both cooperate with the scales A and A' on members 1 and 6, respectively, in obtaining air speed with corrections for air density and air compressibility. Scale C is graduated in terms of indicated temperature and incorporates temperature values according to the formula:

$$\sqrt{\frac{T}{T_0}}$$

in which T is the actual absolute temperature at operational level and $T_0$ is the absolute temperature at sea level. The range of the scale is from plus 50 to minus 80 degrees centigrade. This formula and the scale itself is not new and is widely used by similar computers. Scale D is graduated in terms of pressure altitude and incorporates values of density and compressibility of air according to the formula:

$$B\sqrt{\frac{P_0}{P}}$$

in which $$B=1+\frac{V_t^2}{4\gamma RT}\left(1-\frac{P}{P_0}\right)$$

In this formula "B" is the compressibility term and a function of the true air speed, R is a gaseous constant, T is absolute temperature at operational altitude, P is the pressure at operational altitude, $P_0$ the pressure at sea level and $\gamma$ the ratio of the specific heats for the ambient atmosphere. This formula and scale D have been developed in connection with the present invention. The range of the scale shown in the drawing is from 0 to 40,000 feet altitude and can be applied to any speed or altitude. Prior computers apply the second part of the formula only, which is:

$$\sqrt{\frac{P_0}{P}}$$

and consequently are in error in speed as mentioned before. Using scales C and D results in a final computation as follows:

$$V_t = V_i \times B\sqrt{\frac{P_0}{P}} \times \sqrt{\frac{T}{T_0}}$$

in which $V_i$ is the indicated air speed corrected for installation and position error, and $V_t$ is a selected air speed, generally the cruising speed of the aircraft.

The procedure to correct air speed for density and compressibility is as follows: Set indicated temperature on scale C, opposite pressure altitude on scale D; opposite indicated air speed on moving scale A', read air speed corrected for compressibility and density on fixed scale A. For example, with pressure altitude 32,00 feet, temperature minus 35 degrees centigrade, indicated air speed 234 M. P. H., the true air speed will be 401 M. P. H. Prior conventional computers will give 410 M. P. H. speed, 9 M. P. H. more than the actual speed.

Scale E on member 6 is graduated in terms of speed and compressibility heating according to the formula:

$$\sqrt{1+\frac{V^2}{337}}$$

in which V is the true air speed. Although this formula is based on standard atmospheric temperature, deviation therefrom will cause only a negligible error. Scale "E" is graduated in hundreds of miles per hour, marked 2, 4, 5 and 6, which stand for 200, 400, 500 and 600 miles per hour. The pointer at 14 on scale A' is the starting point of scale E, which is inverted with respect to scale A'. When the pointer 14 is set to any number representing speed on the outer fixed scale A, the speed corrected for compressibility heating is readily available on the outer fixed scale A, opposite the same speed marking on scale E. For example, assuming that the speed corrected for compressibility and density has already been found and is 600 M. P. H. and the correction for compressibility heating is required, set the pointer of scale E at 14 and opposite 600 on scale A, and then read the speed corrected for compressibility heating, 564 M. P. H. on the same scale A, opposite the mark 5 (for 600) on scale E. In this case the correction amounts to 36 M. P. H. Scale E has been developed in connection with the present invention.

Thus by first correcting indicated air speed for air density and compressibility by using scales C and D in conjunction with scales A and A', and then taking the thus partially corrected air speed and applying a correction for compressibility heating by using scales A and E, the true corrected air speed is obtained, and may be used in standard time-distance-speed computations by employing scales A, A' and B.

Scales G and H are for altitude correction, scale G on ring member 6 incorporating absolute temperatures, being graduated in terms of temperatures from plus 50 to minus 60 degrees and cooperating with scale H on fixed result indicator member 7 incorporating absolute temperatures and graduated in terms of altitude from 0 to 30,000 feet. These two scales G and H cooperate with the two scales A and A' on members 6 and 7, respectively and are to correct the altimeter indications for true altitude. In other words, pressure altitude as indicated on the altimeter is converted to true altitude by correcting for non-standard air conditions as evidenced by the air temperature.

A scale F on fixed result indicator member 7 between scales D and H incorporates the density of the air under standard atmospheric conditions. It is calibrated in terms of altitude from 0 to 40,000 feet and it cooperates with a pointer DN provided on ring member 6. In order to find the density altitude, scales C and D are used. When the pressure altitude on scale D is set opposite temperature on scale C, the density altitude is readily available on scale F opposite the pointer DN. This density altitude is used by the flier to determine the density of the air which is being fed into his engine.

Figure 3:
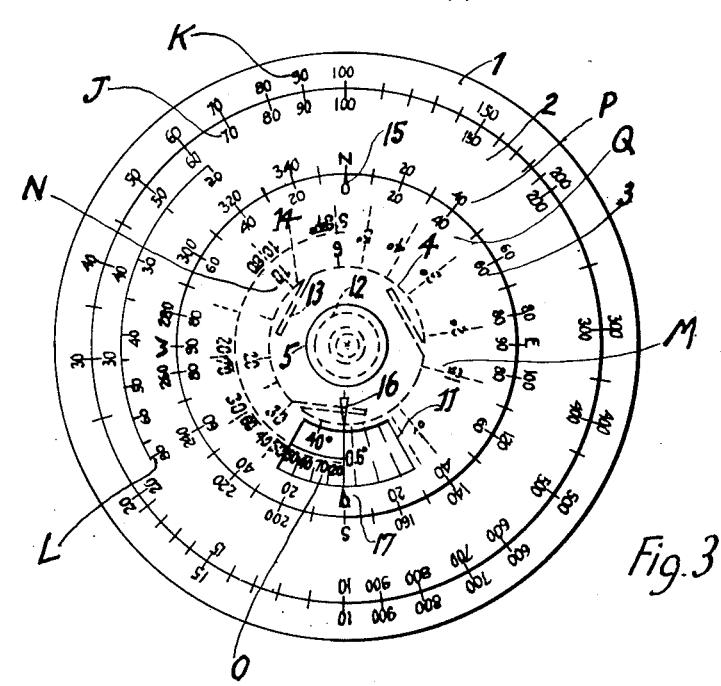
Fig. 3 is a plan view of the rear or vector face of the computer.

The rear or vector face of the computer illustrated in Figure 3 is provided with a number of different scales, all of them arranged in two logarithmic units, namely with log 10 equal to 180 degrees and with two compass roses P and Q with equal distance graduations.

Fixed base member 1 carries a standard numerical logarithmic scale K numerically ranging from 10 to 1000. Movable ring member 2 carries a standard numerical logarithmic scale J identical to scale K and cooperating therewith. These scales may be used for normal slide rule computations of multiplication and division. Ring member 2 also carries a short scale L which is a sine scale graduated in terms of latitude and which is used to determine the drift in pressure pattern navigation. The graduations are arranged in degrees of latitude from 20 to 80 degrees disposed counter-clockwise. It will be noted that scales K, J and L are fully exposed to view.

Ring member 2 is also provided with three concealed logarithmic scales M, N, and O which are exposed to view only through a window 11 provided in fixed member 3. Scale M is a sine and tangent scale for angles from 0.6 to 5.6 degrees disposed counter-clockwise. Scale N is a tangent scale for angles from 6 to 45 degrees and disposed counterclockwise. Scale O is a double scale representing sine and cosine values for angles from 6 to 90 degrees and from 0 to 86 degrees respectively. The sine values are given for the angles marked on the left of the graduation lines and are disposed in counter-clockwise direction. The cosine values stand to the right of the graduation lines and in the illustrated example they are provided with a superimposed line for convenience of identification. These cosine values are disposed clockwise.

A pointer 17 on fixed member 3 cooperates with scale O while a pointer 16 on the opposite side of window 11 cooperates with scale N. Both these pointers 16 and 17 are indicative for scale M.

The functional relations between the numerical scales K and J and the trigonometric scales M, N, and O are these: Setting two numbers opposite one another on scales K and J implies setting the proportion of the same two numbers, the quotient of which is the natural value of a trigonometric function of an angle, the angle being given in the result indicator 11, at pointers 16 or 17, as the case may be. In navigational terms, related to wind problems, setting the wind angle on scale O against pointer 17, the cross wind is readily available on scale K, opposite wind force on scale J. Setting the wind angle on scale O, using the overlined numbers (cosine) against pointer 17, the head or tail wind is readily available on scale K opposite the wind force on scale J. Furthermore setting air speed on scale J opposite cross wind on scale K, the drift angle is readily available on scale O opposite pointer 17.

Movable ring member 2 is provided with a compass rose P graduated in degrees from 0 to 360 disposed in clockwise direction. The outer edge of fixed result indicator member 3 is provided with four equal quadrants graduated alternatingly in clockwise and counter-clockwise directions from 0 to 90 degrees. When a given angle of scale P is set opposite to pointer 15, the angle included between the pointer 15 and a direction given on scale P is readily available on scale Q. This may be expressed in navigational terms by stating that the direction of flight of an aircraft can be indicated by the pointer 15. Opposite to the direction of the wind on scale P the wind angle proper is available on scale Q.

The computer of the present invention, although compact, small, and very easy to operate, nevertheless provides for accurate solution of most aircraft navigational problems. The vector problems relating to the effect of wind and the following of a given track are solved in slide rule fashion and without any graphical operations. Speed-time-distance computations may be carried out with even greater facility. Corrections of indicated air speed for air density, air compressibility, and the effect of compressibility heating may all be taken into account, thus giving use to extreme accuracy. Altitude corrections for variations in air temperature may be made, and determination of density altitude for variations in air temperature at a given pressure altitude is facilitated. Thus a single computing instrument, operatable for each computation in a basically similar manner and requiring a similar technique, is made available to the pilot, said instrument being readily manipulatable by a pilot who is alone in the aircraft.

The construction of the computer is inexpensive but accurate. The use of two fixed members and one movable member, and the provision of a result-indicating window in one of said members, makes for ease of manipulation and reading. The movable member is so mounted on the computer as to be adjustable for improved accuracy, and a frictional drag is exerted thereupon in a simple manner by its bearing and spacer, so that said movable member will remain in any position in which it may be placed, secure against accidental displacement.

While but a single embodiment of the present invention has been here disclosed, it will be apparent that many variations may be made therein, all within the spirit of the invention as defined in the following claims.

I claim:

1. A computer comprising a fixed circular base member having thereon a logarithmic scale in terms of distance, a rotatable member in front of and smaller than said base member and rotative thereto, said rotatable member having an outer logarithmic scale in terms of time and an inner logarithmic scale in terms of speed, said inner scale being inverted and angularly disposed by logarithmic 60 with respect to said outer scale, and a result indicator fixed to said base member, overlying said rotatable member and of a diameter to conceal the inner scale and expose the outer scale on said rotatable member, said result indicator having an opening therethrough over said inner scale so as to reveal parts thereof.

2. The computer of claim 1, in which said rotatable member and one of said fixed members carry cooperative logarithmic scales, one graduated in terms of temperature and incorporating the square root of the ratio of observed air temperature to air temperature at sea level, and the other graduated in terms of altitude and incorporating functional values of the density and compressibility of air in accordance with altitude and speed.

3. The computer of claim 2, in which one of said scales is on said rotatable member and the other of said scales is on said result indicator.

4. The computer of claim 2, in which one of said scales is on said rotatable member and the other of said scales is on said result indicator, and in which said rotatable member carries a logarithmic scale graduated in terms of speed and incorporating values of the compressibility heating of air with regard to speed, said scale being inverted with respect to the outer scale on said rotatable member.

5. The computer of claim 1, in which one of said fixed and rotatable members carries a logarithmic scale graduated in terms of speed and incorporating values of the compressibility heating of air with regard to speed, said scale being inverted with respect to the outer scale on said rotatable member.

6. The computer of claim 1, in which said rotatable member and one of said fixed members carry cooperating logarithmic scales, one graduated in terms of temperature and the other graduated in terms of altitude and incorporating values of air temperature in terms of altitude.

7. The computer of claim 6, in which said one scale is on said rotatable member and said other scale is on said result indicator.

8. The computer of claim 1, in which one of said members carries an indicating mark, another member movable relative thereto carrying a logarithmic scale graduated in terms of altitude and incorporating values of the density of air in terms of altitude.

9. The computer of claim 8, in which said indicating mark is on said rotatable member and said scale is on said result indicator.

10. A computer comprising a fixed circular base member having thereon a logarithmic scale, a rotatable ring member in front of and smaller than said base member and having an open central portion, said rotatable ring member having an outer logarithmic scale and an inner logarithmic scale, a result indicater fixed to said base member, overlying said rotatable ring member and of a diameter to conceal said inner scale and expose said outer scale on said rotatable ring member, said result indicator having an opening therethrough over said inner scale so as to reveal parts thereof, and a circular spacer member in front of and fixed to said base member and snugly fitting within the open central portion of said ring member.

11. The computer of claim 10, in which the scale on said base member is graduated in terms of distance, the outer scale on said ring member is graduated in terms of time, and the inner scale on said ring member is graduated in terms of speed and is inverted and angularly disposed by logarithmic 60 with respect to said outer scale.

12. The computer of claim 11, in which said rotatable member and one of said fixed members carry cooperative logarithmic scales, one graduated in terms of temperature and incorporating the square root of the ratio of observed air temperature to air temperature at sea level, and the other graduated in terms of altitude and incorporating functional values of the density and compressibility of air in accordance with altitude and speed.

13. The computer of claim 11, in which one of said fixed and rotatable members carries a logarithmic scale graduated in terms of speed and incorporating values of the compressibility heating of air with regard to speed, said scale being inverted with respect to the outer scale on said rotatable member.

14. The computer of claim 11, in which said rotatable member and one of said fixed members carry cooperating logarithmic scales, one graduated in terms of temperature and the other graduated in terms of altitude and incorporating values of air temperature in terms of altitude.

15. The computer of claim 11, in which one of said members carries an indicating mark, another member movable relative thereto carrying a logarithmic scale graduated in terms of altitude and incorporating values of the density of air in terms of altitude.

16. The computer of claim 10, in which the scale on said base member and the outer scale on said ring member are of numerical values, and in which the inner scale on said ring member is composite in nature and comprises a first scale representing the sine and tangent values of small angles, a second scale representing the tangent values of larger angles, a third scale representing the sine values of larger angles, and a fourth scale representing the cosine values of angles.

17. The computer of claim 16 in which the ring member carries a logarithmic sine scale which is a function of the degrees of latitude.

18. The computer of claim 16, in which the ring member carries an exposed compass rose for angles from 0° to 360° arranged clockwise, and in which the result indicator carries an exposed compass rose of four quadrants, each quadrant extending from 0° to 90° in the reverse direction to the adjacent quadrants.

19. The computer of claim 10, in which said circular spacer member is provided with chordal slots at the periphery thereof defining segmental spring arms which engage and exert radially outward pressure on the inner surface of said ring member.

20. The computer of claim 10, in which said base member, said result indicator, and said spacer member are all centrally axially apertured, in combination with a fastening member passing through said apertures so as to secure said members together, the axial aperture of said spacer member being larger than said fastening member so that said spacer member and said rotatable ring member may be adjusted concentrically in relation to said fixed members.

OSCAR E. BATORI.

No references cited.